//

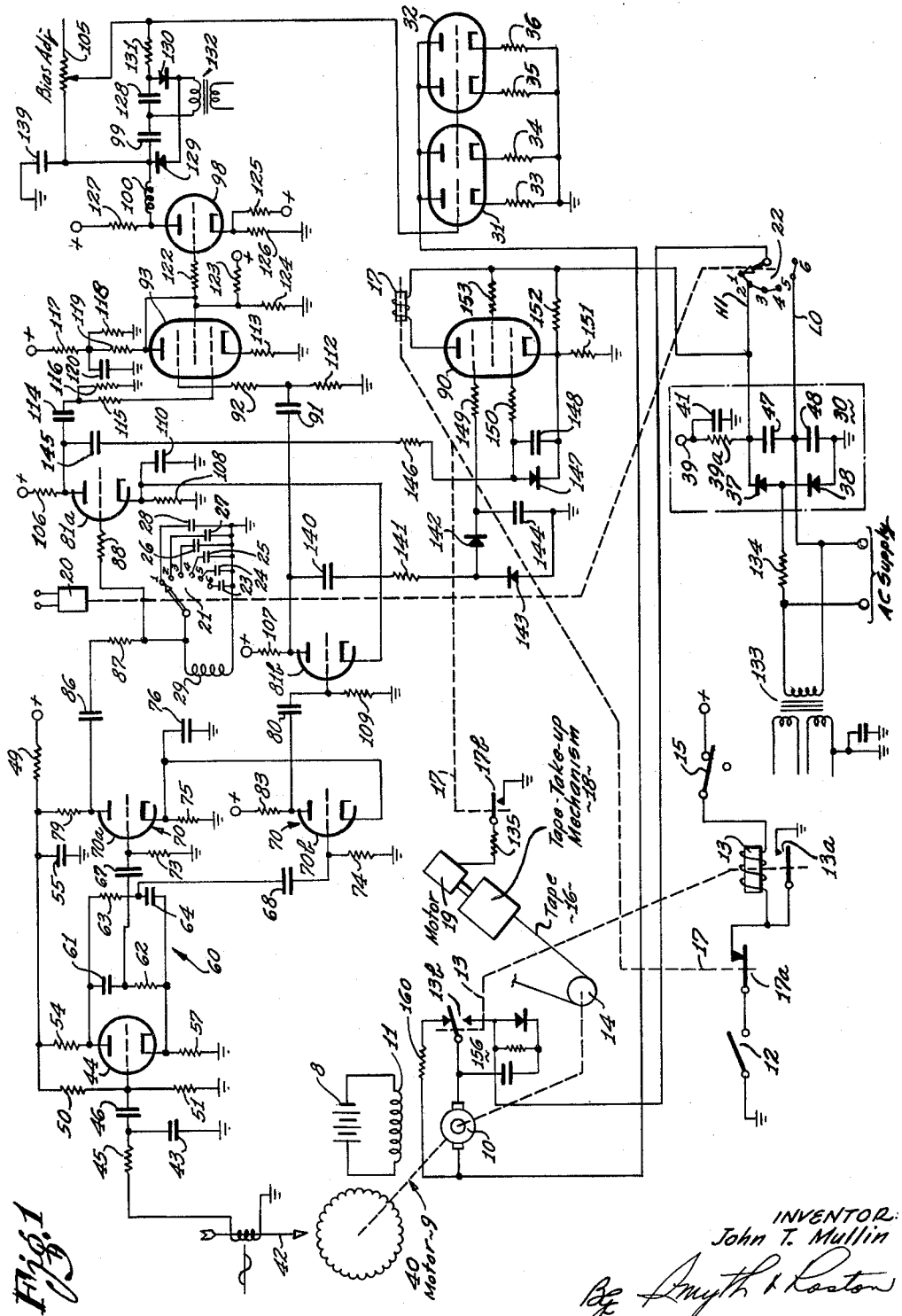

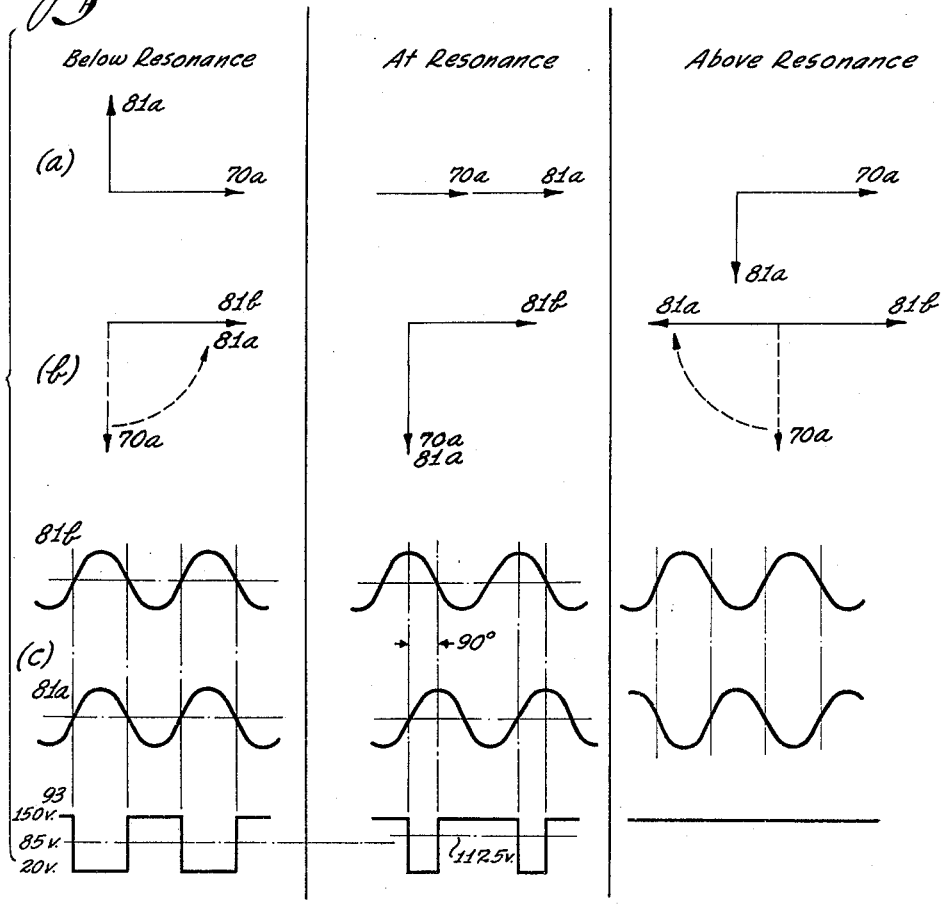
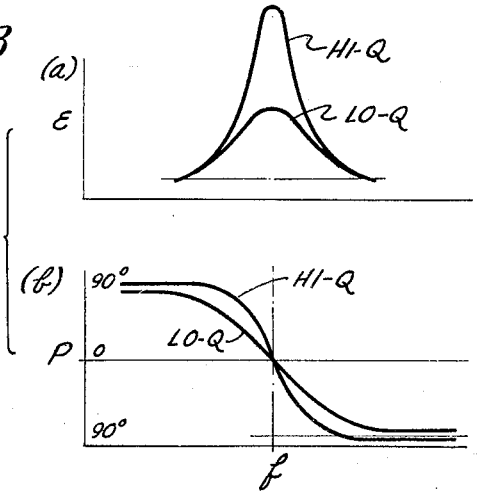

United States Patent Office 3,097,332
Patented July 9, 1963

3,097,332
SPEED CONTROL AND REGULATING CIRCUITS
John T. Mullin, Los Angeles, Calif., assignor to Minnesota Mining and Manufacturing Company, St. Paul, Minn., a corporation of Delaware
Filed Jan. 8, 1959, Ser. No. 785,624
17 Claims. (Cl. 318—314)

This invention relates to speed control and regulating circuits and, more particularly, to circuits which determine the speed setting of an adjustable electric motor and which reduce inherent variations of speed due to changes in loading, line voltage and the like at each speed setting.

There are many applications in which it is important to provide a rigorously constant speed electric drive. For example, in recording and reproducing television signals, radar signals, telemetering signals and the like, short period variations in speed result in phase or angular modulation of the signals. Such variations may either be in the form of drift in the same speed direction or in the form of oscillations in speed about the desired operating speed. Either of these variations may destroy the usefulness of the recording or reproduction.

Various methods have been used to compensate for and minimize the phase modulation resulting from speed variations of an electric drive. Generally, these methods involve the use of a feedback system which varies the effective torque of a synchronous alternating current drive by developing an error signal proportional to the change in speed of the drive from a reference speed. These drives are bulky and expensive, and the frequency sources which provide for the effective reference speed require stabilizing equipment which are also expensive. Shunt type direct current motors are light, reliable and inexpensive but their speed varies readily with every variation in load and even more complex regulating equipment has been required for them than for the synchronous drives.

In one specific embodiment of this invention, a shunt type direct-current motor is utilized and a rigorous constant speed is achieved without requiring complex and expensive regulating equipment and without utilizing a subsidiary source of frequency as a reference. Two quadrature signals are developed having a frequency which varies in direct proportion to the speed of the direct current motor. The signals are developed in part by utilizing a tachometer generator having a moving element driven by the motor shaft to produce a signal having a frequency related to the speed of the motor shaft. The signal from the tachometer generator is then converted into a pair of signals by a phase splitting network which produces the quadrature relationship between the signals in the pair regardless of the frequency of the generated signal supplied thereto from the tachometer generator.

One of the two signals from the network is applied without further phase shift to a gating arrangement. The other of the two signals from the network is applied to an adjustable tuned circuit arrangement which is utilized in part to provide a rigorous control over the speed of the motor so as to maintain the speed constant. A rigorous constant speed is achieved by providing the tuned circuit arrangement with a high Q to obtain large deviations in control voltage in accordance with small changes in motor speed. The high Q of the arrangement provides for a sharp rate of change of phase at frequencies in the vicinity of the resonant frequency of the tuned circuit arrangement.

A shaft in the phase of the second signal from the network occurs when the frequency of the signal from the network varies between one side of the resonant frequency of the tuned arrangement and the other side of the resonant frequency. This shift in phase of the second signal occurs because of the vectorial shift in impedance of the tuned circuit for different frequencies below and above the resonant frequency of the tuned circuit. The phase of the second signal shifts through an angle as great as 90 degrees as the frequency of the signal increases from a value below the resonant frequency of the tuned circuit to the resonant frequency. Similarly, the phase of the second signal shifts through an additional angle as great as 90 degrees as the frequency of the second signal increases from the resonant frequency to a value above the resonant frequency.

The output signals from the tuned circuit arrangement and the first signal from the phase-splitting network are introduced to the gating arrangement, which provides an output only during the time that both of the signals introduced to the gating arrangement are simultaneously positive. Depending upon the frequency of the signal applied to the tuned circuit arrangement, the two signals applied to the gating arrangement may be in phase, 90 degrees out of phase or 180 degrees out of phase or at any value between the range of 0 degree and 180 degrees. The frequency range in which the phase shift occurs between signals in phase and signals 180 degrees out of phase is very small because of the high Q of the tuned circuit arrangement.

By providing the gating arrangement with saturable characteristics, the output from the gating arrangement can be shaped into a square wave having a pulse duration which is a maximum when the two signals are in phase and which is zero when the two signals are 180 degrees out of phase. Because of the saturable characteristics of the gating arrangement, the magnitude of the square wave is independent of the phase difference between the two signals introduced to the gating arrangement. The output from the gating arrangement is, therefore, a series of pulses having a constant amplitude and having a duty cycle which varies considerably with small changes in frequency of the signals developed by the tachometer.

By squaring the gated signals, the response in the narrow band of frequencies about resonance is substantially linear because the duty cycle is directly proportional to the phase shift and the phase shift is relatively linear in the vicinity of resonance. The signals from the gating arrangement are filtered to provide a proportionate direct voltage varying rapidly in magnitude with speed variations. The direct voltage is utilized to control the current introduced to the motor armature. By varying the armature current instead of the field current and by maintaining the motor field fully excited, the motor accelerates rapidly and the system rapidly responds to transients which tend to vary the instantaneous speed of the motor.

Other features of this invention relate to the provision of means operative when the motor is accelerated and decelerated to respectively maintain take-up tension on the tape driven by the motor and to protect the tape from being snapped. The protection means, which is not operated when the motor is at a standstill and when the motor is up to speed, includes means for gating the first signals from the network and the second signals from the network after the shift in phase of the second signals. The gating means output is inhibited when the frequency of the signal developed by the tachometer generator is in the vicinity of the resonant frequency of the tuned circuit arrangement. By gating the first and second signals from the network in this manner, protection of the tape is obtained during acceleration and deceleration regardless of the speed setting of the tuned circuit. Further protection of the tape is obtained by preventing the motor driving the tape from becoming operative after the circuit to the motor has become momentarily interrupted and until the movement of the tape has completely stopped after such interruption.

Further advantages and features of this invention will become apparent upon consideration of the following description taken in conjunction with the drawing wherein:

FIGURE 1 is a circuit representation of the speed control and regulating circuit of this invention;

FIGURE 2 provides a series of curves illustrating the operation of the speed control and regulating circuit shown in FIGURE 1 for speeds below, at and above a desired speed of the motor; and FIGURE 3 provides a series of curves illustrating the operation of a high Q and a low Q resonant circuit arrangement of the speed control and regulating circuit of this invention.

Referring to FIGURE 1, a direct current motor 9 includes an armature 10 and a field winding 11. The field winding 11 is energized by the source of unidirectional current 8, which is shown for purposes of convenience as a battery. The motor armature 10 is energized over a path, hereafter described in detail, which includes two double triodes 31 and 32 and a voltage doubler circuit 30.

The motor 9 is utilized to rotate a capstan 14 which may be part of conventional magnetic tape recording and reproducing equipment. The rotating speed of the motor 9 and the capstan 14 is dependent upon the setting of a selector switch assembly which includes a winding 20 and a pair of stepping switches 21 and 22 having ganged armatures. The winding 20 of the switch assembly is energized to step the armatures of the switches 21 and 22 to any one of six positions on the switches, these positions being designated as 1 to 6, inclusive, in FIGURE 1. At each of the positions 1 to 6 the armature of the switch 21 connects a different one of six associated capacitors 23 to 28, inclusive, across an inductor 29. As is hereinafter described, the resonant frequency of the circuit arrangement including the inductor 29 and one of the capacitors 23 to 28, inclusive, functions to select the motor speed and it also functions as part of the regulating system which maintains the selected speed at a constant value. The setting of the armature in the switch 22 determines which one of two potentials is supplied from the voltage doubler circuit 30 to the armature current path of the motor 9.

Assuming that the armatures of the switches 21 and 22 are set at position 1, the armature of the switch 21 connects the capacitor 28 across the inductor 29 and the armature of the switch 22 connects the larger of the two potentials from the circuit 30 to the motor armature current path. The smaller the capacitor utilized in the tuned circuit arrangement, the larger is its resonant frequency and the larger is the selected motor rotating speed. Frequencies of 4320, 2160, 1080, 540, 432 and 270 cycles per second are illustrative resonant frequencies and tape speeds of 60, 30, 15, 7.5, 6 and 3.75 inches per second may correspond thereto. With the relatively small capacitor 28 selected, the resonant frequency of the parallel tuned circuit may be 4320 cycles per second.

The Q of the tuned circuit, which is the ratio of inductive reactance to resistance, is relatively high. As illustrated in FIGURE 3, a high Q circuit provides for a relatively sharp peak of output voltage and a relatively abrupt change of phase with variations of frequency. As is hereinafter described, these features of the high Q tuned circuit provide for accurate regulation of the motor speed and for control of the tension of a tape 16 driven by the capstan 14.

With the armatures of the stepping switches 21 and 22 set at position 1, the motor 9 and a takeup motor 19 are started by manually closing a run switch 12. The motor 19 drives a conventional takeup mechanism 18 to which the tape 16 is fed by the capstan 14. The run switch 12 closes an operating circuit for a start relay 13, this circuit including a source of positive potential, the normally closed armature of a stop switch 15, the winding of the start relay 13, a normally closed switch 17a of a safety relay 17 and the now closed switch 12. When the start relay 13 is energized, it becomes locked to ground through its switch 13a and it closes a path for the motor armature 10 by obtaining an actuation of the armature of a single-pole, double-throw switch 13b into engagement with the lower stationary contact of the switch in FIGURE 1. The circuitry utilized for starting the takeup motor 19 by the relay 13 is not shown.

In FIGURE 1, the positive potential sources such as utilized for operating the start relay 13 are supplied from the voltage doubler circuit 30 briefly mentioned above. In the circuit 30, an alternating potential which is provided to the circuit 30 through a resistor 134 is rectified by the rectifiers 37 and 38. Two magnitudes of rectified potential are provided from the circuit 30, one having an amplitude related to approximately twice the peak amplitude of alternating potential and the other having an amplitude related to approximately the peak amplitude of the alternating potential. The higher of the two voltages is obtained at the terminal common to the capacitance 47 and the resistance 39a by alternately charging two serially connected capacitors 47 and 48. In alternate half cycles, the capacitance 48 is charged through a circuit including the A.C. supply, the capacitance 48, the diode 38 and the resistance 134. In the other half cycles, the capacitance 47 is charged through a circuit including the A.C. supply, the resistance 134, the diode 37 and the capacitance 47. Further filtering action is provided by a series resistance 39a and a parallel capacitance 41. A terminal 39 common to the capacitance 41 and the resistance 49 provides a potential for introduction to various terminals including the switch 15 which is included in a circuit with the relay 13.

As indicated above, when relay 13 is energized, it completes a current path for the motor armature 10. The path for the motor armature 10 includes the circuit 30, the armature of the stepping switch 22 at position 1 of the stepping switch, the armature and lower stationary contact of the switch 13 in FIGURE 1, the motor armature 10 and the commonly connected anodes of a pair of double-triode tubes 31 and 32. The four cathodes of the tubes 31 and 32 are coupled electrically to ground through the resistors 33 through 36, and the grids of the tubes 31 and 32 are commonly connected to a biasing arrangement, hereinafter described, which includes the rheostat 105.

In addition to the capstan 14, the motor 9 drives a tachometer generator 40. The tachometer generator 40 provides a sinusoidal signal having a frequency proportional to the speed of rotation of the motor shaft. Frequencies of 4320, 2160, 1080, 540, 432 and 270 cycles per second are provided respectively for tape speeds of 60, 30, 15, 7.5, 6 and 3.75 inches per second. A sensing member 42 associated with the generator 40 couples the sinusoidal signal through a resistor 45 and coupling capacitor 46 to the grid of a triode tube 44. By way of illustration, the sensing member 42 may be a photo tube which becomes illuminated and extinguished at a frequency corresponding to the frequency of the sinusoidal signal from the tachometer generator 40. The junction between the resistor 45 and the capacitor 46 is coupled to ground through a capacitor 43, which shunts high frequency components to ground.

The tube 44 functions to provide at its anode and cathode two sinusoidal signals respectively displaced 180 degrees in phase from each other and having frequencies equal to the frequency of the signal developed by the tachometer generator 40. As is hereinafter described, these two signals are utilized to control and regulate the speed of the motor 9 and the operation of the safety relay 17.

The grid of the tube 44 is biased by a voltage divider arrangement connected between a positive potential source and ground through the serially connected resistors 49, 50 and 51. The junction between the resistors 50 and 51 is connected to the grid of the tube 44. Anode potential is introduced to the tube 44 from the junction between resistors 49 and 50 through a plate resistor 54. The junction between the resistors 49 and 50 is also coupled to ground through the capacitor 55. The cathode of the tube 44 is coupled electrically to ground through the cathode resistor 57. The signals provided at the anode and cathode of tube 44 have an opposite phase relationship (180 degrees) because the positive input signal increases conduction through the tube 44 to cause the anode potential to decrease and the cathode potential to increase.

The tube 44 supplies the two signals to a phase splitting network 60 which has two symmetrically arranged capacitive branches. One of the branches includes the serially connected capacitor 61 and resistor 62 and the other of the branches includes the serially connected resistor 63 and the capacitor 64. Although the voltage across the two branches is identical because they are in parallel and the current through the two branches is identical because the resistors 62 and 63 are identical and the capacitors 61 and 64 are identical, two quadrature signals (having a 90 degree phase relationship) are derived from the phase splitting network 60. The two quadrature signals are derived because one signal is taken from across the resistor 62 and the other signal is taken from across the capacitor 64. The signal taken from across the capacitor 64 leads the signal taken from across the resistor 62 by 90 degrees regardless of the frequency of the signals from the tube 44. The signal taken across the capacitor 64 leads because the signals at the anode and cathode of tube 44 are 180 degrees out of phase, and the voltage across the capacitor 64 lags the current through it and the current through the resistor 62 by an additional 90 degrees. The total voltage lag across capacitor 64 with respect to the voltage across the resistor 62 is then 270 degrees which is equivalent to a leading phase of 90 degrees.

The angular displacement of the signals from the phase-splitting network 60 relative to the signal developed by the generator 40 changes with frequency but this displacement is not utilized in the regulating system of this invention. The 90 degree displacement between the two signals from the network 60, which is independent of frequency, is utilized and the instantaneous frequency of these signals is utilized to regulate the motor speed and control the safety relay 17. The tubes 70a and 70b function to amplify the two signals introduced to their grids from the network 60 without further phase shift so that the signal from the tube 70b leads by 90 degrees the signal from the tube 70a. The tubes 70a and 70b may be included in a single envelope indicated at 70 in FIGURE 1. The grids of the tubes 70a and 70b are biased respectively by means of the grounded resistors 73 and 74 and the cathodes of the two tubes 70a and 70b are coupled electrically to ground through the common cathode resistor 75 shunted by the capacitor 76. Anode potential is introduced to the tube 70a from the positive potential source through the resistor 49 and an anode resistor 79, and anode potential is introduced to the tube 70b from a positive potential source through the anode resistor 83.

The signal from the tube 70b is coupled through the capacitor 80 to the grid of a tube 81b which may be included with a tube 81b in a single envelope. The signal from the tube 70b is introduced to the grid of the tube 81b without further phase shift but the 90-degree lagging signal from the tube 70a is further phase shifted by the adjustable tuned circuit arrangement which has been described above and which includes the inductor 29 and the capacitor 28. The signal is applied from the anode of the tube 70a through the coupling capacitor 86 and resistor 87 to the parallel tuned circuit arrangement and to the resistor 88 which is connected to the grid of the tube 81a.

Depending upon whether the frequency of the signals from the tube section 70a is less than the resonant frequency or is greater than the resonant frequency, a leading or lagging phase shift is provided by the tuned circuit arrangement. For example, for frequencies somewhat below resonance, the signal from the tube 70a is advanced 90 degrees in phase by the tuned circuit arrangement so that the signal introduced to the tube 81a becomes shifted into phase with the signal introduced to the tube 81b.

As shown in FIGURE 2, curves (a) illustrate the voltage vectors of the signals from the plate of tube 70a and appearing at the grid of tube 81a in FIGURE 1 for signal frequencies somewhat below, at and somewhat above the resonant frequency of the tuned circuit arrangement formed by the coil 29 and one of the capacitances 23 to 28, inclusive. The relative vectors for the signals at frequencies less than, equal to and greater than the resonant frequency result from the impedance of the tuned circuit at these frequencies. For example, the tuned circuit presents only an effective resistance at the resonant frequency. However, the tuned circuit has a capacitive reactance at frequencies below the resonant frequency and has an inductive reactance at frequencies above the resonant frequency. This causes the signals from the tube 70a to become shifted by as much as 90 degrees in phase in one direction for signals below the relative frequency relative to the phase of the signals produced by the tube 70a for signals at the resonant frequency. Similarly, the signals from the tube 70 become shifted by as much as 90 degrees in phase in an opposite direction for signals having a frequency above the resonant frequency relative to the phase of the signals produced by the tube 70a at the resonant frequency.

The curves (b) in FIGURE 2 illustrate the phase shifting effect of the tuned circuit arrangement on the signals introduced from the tube 70a to the tube 81a relative to the signal applied without any phase shift to the tube 81b from the tube 70b. For frequencies somewhat below resonance, the output voltage from the tuned circuit formed by the coil 29 and one of the capacitances 23 to 28, inclusive, causes the signal introduced to the tube 81a to become shifted into phase with the signal introduced to the tube 81b.

When the signal from the tube 70a is at the resonant frequency of the tuned circuit arrangement, no additional phase shift takes place in the signal introduced to the tube 81a so that the signal applied to the tube 81a continues to lag by 90 degrees the signal introduced to the tube 81b. For signals from the tube 70a somewhat above the resonant frequency of the parallel tuned circuit arrangement, a phase shift of 90 degrees in a lagging direction is produced in the signal introduced to the tube 81a so that a total lag of 180 degrees exists with respect to the signal introduced to the tube 81b.

As the motor speed and developed signal frequency changes, the high Q circuit causes a change in phase to occur from 90 degrees in one direction to 90 degrees in the other direction in the tuned circuit with small changes in frequency from one side of the resonant frequency to the other. This factor provides, as is hereinafter described, for a large change in control voltage even with a small change in motor speed.

Both the tubes 81a and 81b operate to amplify without additional phase shift the signals applied to their grids. Positive potential is supplied to the respective anodes through the plate resistors 106 and 107; grid bias to the tube 81b is obtained through the grounded grid resistor 109; and the two tubes 81a and 81b are provided with a common cathode resistor 108 which is in parallel with a grounded capacitor 110.

The output signals provided from the tubes 81a and 81b are shown as curves (c) in FIGURE 2 for operating frequencies somewhat below the resonant frequency, at the resonant frequency and somewhat above the resonant frequency. The signals are substantially sinusoidal in shape and are in phase for frequencies somewhat below resonance, 90 degrees out-of-phase at resonance and 180 degrees out-of-phase for frequencies somewhat above resonance. The signals from the tubes 81a and 81b are applied respectively to the control and suppressor grids of a pentode tube 93. The signal from the anode of the tube 81a is coupled through the capacitor 114 to the junction of the grounded resistor 116 and the grid resistor 115. The signal from the tube 81b is coupled through the capacitor 91 to the junction of the grounded resistor 112 and the grid resistor 92.

The potential at the anode of tube 93 is dependent upon the voltage divider formed by the resistors 117 and 118. The junction of these two resistors is coupled to ground by the capacitor 120 and coupled to the anode of tube 93 by the resistor 119. The screen grid of the tube 93 is biased by the voltage divider consisting of the resistors 123 and 124 which are connected between the positive potential source and ground. The cathode of tube 93 is coupled electrically to ground through the resistor 113.

The pentode tube 93 functions as a gate because its anode potential changes only when both input signals are relatively positive to obtain a flow of current through the tube. When both input signals are positive, a saturated current flows through the pentode tube 93 since the pentode has short grid-base characteristics and since the input signals from the tubes 81a and 81b have relatively large amplitudes; these characteristics cause the tube 93 to become saturated even when the amplitude of the positive input signals is relatively low. Because of this, the pentode tube 93 operates to convert the sinusoidal signals from the tubes 81a and 81b into signals having rectangular characteristics. This may be seen from the curves shown in FIGURE 2 (curve (c)).

As shown in FIGURE 2, curve (c), the duty cycle of the output from the pentode tube 93 changes from approximately a 180 degree duty cycle to approximately a 90 degree duty cycle as the frequency of the signal developed by the tachometer 40 increases from a value below resonance to the resonant frequency. This corresponds to the time in which the input signals from the tubes 81a and 81b are simultaneously positive. No output is obtained from the pentode tube 93 when the signals from the generator 40 have frequencies somewhat above resonance, thereby causing the output from the pentode to have a zero duty cycle for such frequencies. No output is obtained from the pentode tube 93 at frequencies somewhat above resonance since conduction through the tube is inhibited by a signal of negative polarity on either the control grid or suppressor grid of the tube.

When the two signals supplied to the pentode tube 93 are in phase, the potential at the anode of the tube 93 changes from 150 volts to 20 volts during the flow of current through the tube. Since the pentode tube 93 is conductive for approximately 50 percent of the time for an in-phase relationship of the input signals, an average potential of 85 volts is obtained at the anode of the tube 93 when the two signals applied to the tube are in phase. When the two signals are 90 degrees out-of-phase, the anode potential of tube 93 changes only for one quarter of each cycle so that the average voltage is 117.5 volts. When the two signals are 180 degrees out-of-phase, the anode potential of tube 93 does not change since the tube 93 does not become conductive for any portion of the cycle. This causes the average potential at the anode of the tube 93 to remain at 150 volts at such times.

By limiting the magnitude of the pulses from the pentode tube 93, a linear response is achieved for frequencies in the vicinity of resonance. As shown in FIGURE 3(b), even for a high Q circuit the change in phase from 90 degrees in one direction to 90 degrees in the other direction for the signals from the tube 81a occurs in a band of frequencies about the resonant frequency rather than instantaneously at frequencies above and below the resonant frequencies. This band of frequencies decreases in width as the Q of the tuned circuit increases. For frequencies very close to the resonant frequency, the change in phase of the signals from the tube 81a as a result of the action of the tuned circuit arrangement is, therefore, less than 90 degrees. The change in phase of the signals from the tube 81a tends to vary linearly with changes in frequency in the range close to the resonant frequency since the response of the tuned circuit tends to vary linearly in this range, as may be seen for the curve designated as "hi Q" in FIGURE 3(b).

The angular displacement in phase shift between the two signals from the tubes 81a and 81b also changes in a linear manner as a result of the clipping action provided by the pentode tube 93. The clipping action of the pentode 93 produces such a linear effect since it causes the signals introduced to the pentode from the tubes 81a and 81b to have equal effects. If the pentode 93 did not produce such a clipping action, the variable response of the tuned circuit for different frequencies would cause the signals obtained from the tube 81a to vary in characteristics relative to the signals from the tube 81b so as to affect the response of the pentode 93. Since the response of the tuned circuit tends to vary linearly with changes in frequency in the range near the resonant frequency as may be seen from FIGURE 3(b), the duty cycle of the output signal from the tube 93 does not change instantaneously but changes sharply and linearly in the range of a 180 degree duty cycle to a zero duty cycle with corresponding changes in frequency.

The signal from the anode of the pentode 93 is supplied through resistor 122 to the grid of an inverting triode 98 which inverts the signals from tube 93. The cathode of the tube 98 is connected to the junction of the resistors 125 and 126 which are connected respectively to a positive potential source and to ground. The anode to tube 98 receives anode potential through the plate resistor 127. The output from the inverting triode 98 is filtered by a low pass filter including a serially connected capacitor 99 and an inductor 100. In this way, the various stages including the tubes 70a and 81a, the tubes 70b and 81b and the tubes 93 and 98 and including the capacitor 99 and the inductor 100 operate to produce a direct potential which varies rapidly in magnitude as the frequency of the developed signal changes through the resonant frequency. By inverting the signal, the output potential from the tube 98 increases in a positive direction from an average value for frequencies below the resonant frequency of the tuned circuit arrangement. Similarly, the output potential from the tube 98 decreases in a negative direction from an average value for frequencies above the resonant frequency.

The potential provided by the inverter triode 98 is filtered by the inductor 100 and capacitor 139 and then shifted by an adjustable bias supply to magnitudes suitable as inputs for the tubes 31 and 32. The bias potential is derived from the alternating current supply which is coupled through a transformer 132 to a full wave rectifier including the diodes 129 and 130. The diode 129 is serially connected with the capacitor 99 across the secondary of the transformer 132, and the diode 130 is serially connected with a capacitor 128 across the secondary of the transformer 132. The junction between the capacitor 128 and the diode 130 is coupled electrically through a resistor 131 to the adjustable contact of the rheostat 105 and to the grids of the double triodes 31 and 32. The diodes 129 and 130 and the capacitances 99 and 128 operate in a manner similar to that described previously for the circuit 30 to rectify the voltage from the transformer 132 and simultaneously to provide a voltage doubling action. The direct voltage provided by the diodes 129 and 130 opposes the positive varying direct voltage from the tube 98. The rheostat 105 is utilized to adjust the voltage applied to the grids of the tubes 31 and 32.

As described above, all four anodes of tubes 31 and 32 are in parallel with each other and in series with the armature 10 of the capstan motor 9. As the potential on the grids decreases due to an increase in frequency of the developed signal, the current through the armature 10 decreases. For frequencies in the vicinity of the resonant frequency of the tuned circuit arrangement, the change in potential is great for small changes in frequency. By varying the current through the armature 10 of the motor 9 rather than the current through the field winding 11 of the motor, the machine starts very rapidly with a strong field. Furthermore, the speed of response to transients which could cause serious instantaneous variations in speed are very much better than could be achieved with field control. A faster response is, in this manner, achieved by regulating the armature current.

The output signals from the tubes 81a and 81b are also respectively applied to the control grid and suppressor grid of a tube 90. Before the motor is started, the tube 90 is non-conductive so that the relay 17 connected in series therewith is not operated. As soon as the switch 12 is closed, a positive voltage is developed at the suppressor grid of the tube 90, causing the tube 90 to become conductive and operate the relay 17. The positive control signal is developed from the anode of the tube 81b which is connected by the capacitor 140 and resistor 141 to the diodes 142 and 143. The diode 143 shunts to ground the negative half of the signal from the tube section 81b. The diode 142 transmits the positive half cycles to develop a positive potential across a grounded capacitor 144, which is connected through a resistor 149 to the suppressor grid of tube 90.

The positive potential developed causes the tube 90 to conduct sufficiently to energize the relay 17. The operating path for relay 17 is from the voltage doubler circuit 30 through the winding of relay 17, tube 90, and the cathode resistor 151 to ground. The resistor 151 and a resistor 152 connected to the voltage divider circuit 30 control the potential produced at the cathode of tube 90. The screen grid of the tube 90 is connected by resistor 153 to the circuit 30.

When relay 17 becomes energized, it opens a switch 17a and closes a switch 17b. Upon the opening of the switch 17a, the start switch 12 for the start relay 13 becomes interrupted. However, the relay 13 still remains energized because of the locking path through the switch 13a. When the switch 17b becomes closed, a control path through a resistor 135 to the take-up motor 19 becomes energized. The control path to the motor 19 causes an increased motor torque to be imparted to the motor 19 so that a slight tension is maintained on the tape 16 as the capstan motor 9 accelerates.

When the frequency of the signal developed by the generator 40 approaches the resonant frequency of the tuned circuit arrangement, a disabling potential is introduced from the anode of the tube 81a to the control grid of the tube 90 to obtain a de-energizing of the safety relay 17. As the frequency approaches resonance, the signal from the tuned circuit formed by the coil 29 and one of the capacitances 23 to 28, inclusive, increases considerably in magnitude because the impedance of the tuned circuit is approaching a true resistance with a relatively high value. This in turn causes the potential at the anode of the tube 81a to increase greatly in magnitude as indicated in FIGURE 3(a). The amplified signal is coupled through a capacitor 145, and resistor 146 to the capacitor 148. The positive cycles of the signal from the tube section 81a are shunted from the control grid of tube 90 by the diode 147. The negative potential developed across the capacitor 148 is applied through resistor 150 to the grid of the tube 90. This signal overrides the signal introduced to the suppressor grid of the tube 90 from the tube 81b and causes the tube 90 to become non-conductive so that the relay 17 becomes de-energized. The relay 17 initially becomes energized in this manner when the motor 9 is started, and the relay subsequently becomes de-energized when the motor 9 reaches the operating speed selected by the positioning of the stepping switches 21 and 22. When relay 17 releases, it opens the control path to the take-up motor 19 so that the torque imparted by the motor 19 to the tape can decrease to a normal value.

Relay 17 becomes energized again when the motor 9 is stopped by opening the stop switch 15 to open the operating and locking paths for the start relay 13. When the start relay 13 becomes de-energized, the armature of the switch 13b moves into engagement with the upper stationary contact of the switch in FIGURE 2. This opens the current path for the motor armature 10 and connects a braking resistor 160 across the armature 10 of the motor 9 to cause rapid deceleration. A spark suppression arrangement 156 is connected across the opening contacts of the switch 13b. As the motor decelerates and the frequency of the signal developed by the generator 40 decreases, the amplitude of the disabling potential from the tube 81a to the control grid of tube 90 decreases until it no longer overrides the signal from the section 81b at the suppressor grid of the tube 90. The tube 90, therefore, becomes conductive for a brief interval which exists during the deceleration of the motor 9 until the motor 9 reaches standstill.

When the tube 90 has again become conductive during the deceleration of the motor 9, the tube 90 remains conductive and relay 17 remains operated. As described above, when relay 17 operates, it opens the energizing path for the start relay 13 and causes the locking switch 13a to become opened. Upon an opening of the switch 13a, the relay 13 is prevented from being energized because of the opened state of the switch 17a. The relay 13 is prevented from being energized even if the switch 15 and the start switch 12 should subsequently become closed.

In this way, the relay 13 cannot become energized until the motor 9 has reached standstill and the relay 17 has become de-energized. By preventing the energizing of the relay 13 until the motor 9 is at a complete standstill, snapping the tape 16 by operating the motor 9 during the deceleration of the tape 16 is prevented. In this way, the relay 17 performs the dual function of providing for increased take-up torque during tape acceleration and for preventing the energizing of the start relay 13 and the operation of the motor 9 during tape deceleration.

The following list is illustrative of the components which may be utilized in the speed control and regulating circuit of this invention.

| Component | Unit | Value |
|---|---|---|
| Capacitor 23 | microfarads | .70 |
| Capacitor 24 | do | .26 |
| Capacitor 25 | do | .16 |
| Capacitor 26 | do | .026 |
| Capacitor 27 | do | .0065 |
| Capacitor 28 | do | .0028 |
| Inductor 29 | millihenries | 500 |
| Tubes 31 and 32 | | 6336 |
| Resistors 33 to 36 | ohms | 12 |
| Capacitor 43 | microfarads | .02 |
| Tube 44 | | ½ 12AU7 |
| Resistor 45 | ohms | 2300 |
| Capacitor 46 | microfarads | .1 |
| Capacitors 47 and 48 | do | 1000 |
| Resistor 49 | kilohms | 20 |
| Resistor 50 | megohms | 30 |
| Resistor 51 | do | 1 |
| Resistors 54 and 57 | kilohms | 22 |
| Capacitor 55 | microfarads | 0.5 |
| Capacitors 61 and 64 | do | .001 |
| Resistors 62 and 63 | kilohms | 200 |
| Capacitors 67 and 68 | microfarads | .05 |
| Resistors 73 and 74 | megohms | 5 |
| Tubes 70a and 70b | | 12AT7 |
| Resistor 75 | ohms | 2700 |
| Capacitor 76 | microfarads | 10 |

| Component | Value |
|---|---|
| Resistors 79, 83, 119 and 127 ____kilohms__ | 220 |
| Tubes 81a and 81b _____ | 12AT7 |
| Capacitors 80 and 86 _____microfarads__ | .05 |
| Resistor 87 _____megohms__ | 2.0 |
| Resistor 109 _____kilohms__ | 470 |
| Resistors 106 and 107 _____do____ | 200 |
| Resistor 88 _____megohms__ | 2.2 |
| Resistor 108 _____ohms__ | 2700 |
| Capacitor 110 _____microfarads__ | 25 |
| Capacitors 114 and 145 _____do____ | .005 |
| Resistors 115, 92 and 112 _____kilohms__ | 470 |
| Resistor 116 _____megohms__ | 2.2 |
| Capacitor 91 _____microfarads__ | .002 |
| Resistor 113 _____ohms__ | 94 |
| Resistors 117 and 118 _____kilohms__ | 47 |
| Capacitor 120 _____microfarads__ | 1 |
| Tube 93 _____ | 6BN6 |
| Resistor 122 _____kilohms__ | 120 |
| Resistor 123 _____ohms__ | 6800 |
| Resistor 124 _____kilohms__ | 100 |
| Tube 98 _____ | 6C4 |
| Resistor 125 _____kilohms__ | 33 |
| Resistor 126 _____do____ | 10 |
| Inductor 100 _____henries__ | 1.5 |
| Capacitors 99 and 128 _____microfarads__ | 24 |
| Capacitor 139 _____do____ | .02 |
| Resistor 131 _____kilohms__ | 120 |
| Resistor 134 _____ohms__ | 3 |
| Resistor 135 _____do____ | 25 |
| Capacitor 140 _____microfarads__ | .05 |
| Resistors 141, 146, 149 and 150____kilohms__ | 270 |
| Capacitors 144 and 148 _____microfarads__ | .01 |
| Tube 90 _____ | 6AS6 |
| Resistor 153 _____kilohms__ | 22 |
| Resistor 151 _____do____ | 1 |
| Resistor 152 _____do____ | 10 |

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination for regulating the speed of a motor in driving a medium capable of recording and reproducing information, means coupled to the motor for generating two signals having frequencies related to the speed of the motor, a tuned circuit arrangement coupled to said generating means for phase modulating one of said signals in accordance with the frequency deviation of said one signal from the resonant frequency of said tuned circuit arrangement, and electrical circuitry responsive jointly to the other signal from said generating means and to the phase modulated signal from said tuned circuit arrangement for generating a signal having a rectangular wave and having a duty cycle depending upon the phase displacement between said other signal and said modulated signal for introduction to the motor to regulate the speed of the motor.

2. A circuit for regulating the speed of a motor, including means coupled to the motor for developing first and second signals having frequencies related to the speed of the motor and having phases at a particular angular displacement from each other, a tuned circuit coupled to said developing means for providing a third signal having a phase dependent upon the phase of said first signal and upon the deviation of the frequency of said first signal from the resonant frequency of said tuned circuit, means coupled to said tuned circuit and to said developing means for producing a series of pulses each having saturated characteristics and each having a pulse duration dependent upon the phase relationship of said second signal from said developing means to said third signal from said tuned circuit and having a magnitude independent of the frequency of said first and said second signals, and means responsive to said series of pulses of saturated characteristics for providing a direct signal having a magnitude related to the variations in pulse duration of said series of pulses and for providing for the introduction of the direct signal to the motor to regulate the speed of the motor.

3. In apparatus for regulating the speed of a rotating member, means coupled to the rotating member for developing a signal having a frequency proportional to the angular speed of the rotating member, phase splitting circuit means coupled to said developing means for producing two signals having similar frequencies but phases which differ from each other in a particular relationship, frequency discriminating means coupled to said phase splitting means for adjusting the phase of one of said two signals in accordance with the frequency deviation of said one signal from a particular frequency, and means coupled to said frequency discriminating means and to said phase splitting means for comparing the phases of said adjusted phase signal and the other one of said two signals to provide error pulses having saturated characteristics and having a fixed magnitude and a duty cycle varying in accordance with the compared phases, and means responsive to said error signal and operative upon the rotating member for adjusting the speed of the rotating member in accordance with said error signal.

4. In combination for regulating the speed of a motor in driving a medium capable of recording and reproducing information, means coupled to the motor for generating a pilot signal having a frequency related to the speed of the motor, means coupled to said generating means for developing first and second signals having frequencies related to the frequency of said pilot signal and phases which differ from each other in a particular relationship, tuned circuit means coupled to said developing means for shifting the phase of said first signal relative to the phase of said second signal by an amount and direction depending upon the difference in frequencies between the frequency of said first signal and the resonant frequency of said tuned circuit means, phase comparison means responsive to said phase shifted first signal from said tuned circuit means and to said second signal from said developing means for providing pulses having substantially rectangular characteristics and having a duration dependent upon the relative phases of said phase shifted first signal and said second signal, means responsive to said pulses from said last mentioned means for producing a direct voltage variable with changes in the duration of such pulses, and means responsive to the direct voltage and coupled to the motor for varying the operation of the motor in accordance with the intensity of the direct voltage.

5. In combination for regulating the speed of a motor in driving a medium capable of recording and reproducing information, means coupled to the motor for generating first and second signals having similar frequencies related to the speed of the motor and having phases at a particular angular displacement from each other, a tuned circuit coupled to said generating means for selectively amplifying said first signal in accordance with the frequency deviation of said first signal from the resonant frequency of said tuned circuit, means coupled to said generating means and responsive to said second signal for preventing sharp changes in tension on the medium driven by the motor, and means coupled to said tuned circuit and responsive to said amplified first signal for disabling said preventing means for frequencies of said first signal in a particular band of frequencies including the resonant frequency of said tuned circuit.

6. A circuit for regulating the speed of a motor, including, means coupled to the motor for developing first and second signals having frequencies related to the speed of the motor and phases at a particular angular displacement from each other, a tuned circuit coupled to said developing means for providing a third signal having a phase dependent upon the phase of said first signal and upon the deviation of the frequency of said first signal from the resonant frequency of said tuned circuit, means coupled to said tuned circuit and to said developing means for developing a continuous series of pulses each having saturated characteristics and each having a pulse duration dependent upon the phase relationship of said second signal from said developing means to said third signal from said tuned circuit, means coupled to said series of pulses developing means for providing a direct voltage having a magnitude related to the variations in pulse duration of said series of pulses, means responsive to the direct voltage and coupled to the motor for introducing the direct voltage to the motor to regulate the speed of the motor, means for starting and stopping the motor, and means coupled to said first and second signal developing means and to said starting and stopping means for preventing a starting operation by said starting and stopping means as long as said second signal is being developed during the deceleration of the motor due to a stopping operation by said starting and stopping means.

7. A circuit for regulating the speed of a motor, including, means coupled to the motor for developing first and second signals having frequencies related to the speed of the motor and phases at a particular angular displacement from each other, a tuned circuit coupled to said developing means for providing a third signal having a phase dependent upon the phase of said first signal and upon the deviation of the frequency of said first signal from the resonant frequency of said tuned circuit, means coupled to said developing means and to said tuned circuit for developing a continuous series of pulses each having substantially rectangular characteristics and each having a pulse duration dependent upon the phase relationship of said second signal from said developing means to said third signal from said tuned circuit, means responsive to said series of pulses for providing a direct voltage having a magnitude related to the variations in pulse duration of said series of pulses, means responsive to the direct voltage and coupled to the motor for introducing the direct voltage to the motor to regulate the speed of the motor, means for starting the motor, means coupled to said first and second signal developing means for preventing the operation of said starting means as long as said second signal is being developed, and means coupled to said tuned circuit for disabling said preventing means when the frequency of said first signal is in a particular range of frequencies including the resonant frequency of said tuned circuit.

8. In combination for regulating the speed of a motor in driving a medium capable of recording and reproducing information, means coupled to the motor for generating first and second signals having similar frequencies related to the speed of the motor and having phases at a particular angular displacement from each other, means including a tuned circuit coupled to said generating means for selectively amplifying said first signal in accordance with the frequency deviation of said first signal from the resonant frequency of said tuned circuit, means coupled to said generating means and responsive to said second signal for preventing sharp changes in tension on the medium driven by the motor, means coupled to said tuned circuit and responsive to said amplified first signal for disabling said preventing means for frequencies of said first signal in a particular band of frequencies including the resonant frequency of said tuned circuit, and means coupled to said generating means and to said tuned circuit and responsive jointly to said second signal and to said amplified signal for providing a signal having a duty cycle depending upon the phase displacement between said amplified first signal and said second signal for introduction to the motor to regulate the speed of the motor.

9. In combination for regulating the speed of a motor in driving a medium capable of recording and reproducing information, means coupled to the motor for generating first and second signals having similar frequencies related to the speed of the motor and phases at an angular displacement from each other, means including a tuned circuit coupled to said generating means for selectively amplifying said first signal in accordance with the frequency deviation of said first signal from the resonant frequency of said tuned circuit, means coupled to said generating means and responsive to said second signal for preventing sharp changes in tension on the medium driven by the motor, means coupled to said tuned circuit and responsive to said amplified first signal for disabling said preventing means for frequencies of said first signal in a particular band of frequencies including the resonant frequency of said tuned circuit, means coupled to said generating means and to said tuned circuit and responsive jointly to said second signal and to said amplified signal for providing a signal having a duty cycle depending upon the phase displacement between said amplified first signal and said second signal, said providing means includes gating means for providing a pulse during the times the oscillations of both said amplified first signal and said second signal are of the same particular polarity, and means coupled to the gating means for limiting the output of said gating means to provide a series of pulses each having a duration dependent upon the phase relationship of said second signal to said amplified first signal and having an amplitude which is independent of the frequency of said first and said second signals, and means responsive to the series of pulses for introducing a proportionate direct voltage to the motor to regulate the speed of the motor.

10. In combination for regulating the speed of a motor in driving a medium capable of recording and reproducing information, first means coupled to the motor for generating first and second signals having frequencies related to the speed of the motor and phases angularly displaced from each other by a particular amount, tuned circuit means coupled to said first generating means for providing a signal having an amplitude and a phase dependent upon the frequency deviation of said first signal from the resonant frequency of said tuned circuit means, second means coupled to said tuned circuit means and said first generating means for generating a pulsed signal having a constant amplitude and having a duty cycle related to the phase displacement between said second signal and said signal from said tuned circuit means, means responsive to the pulsed signal for producing a proportionate direct voltage for introduction to the motor to regulate the speed of the motor, and means coupled to said tuned circuit means and to said first generating means for generating a signal having a magnitude related to the amplitude deviation between said second signal and said signal from said tuned circuit means for controlling the tension on said medium.

11. In combination for regulating the speed of a motor in driving a medium capable of recording and reproducing information, means coupled to the motor for generating first and second signals having frequencies related to the speed of the motor and having a particular phase relationship independent of the frequencies of the signals, means coupled to the generating means for varying the phase of the first signal relative to that of the second signal in accordance with variations in the speed of the motor above and below a particular value, means responsive to the first and second signals in the varied phase relationship of the signals for combining the signals to produce pulses having substantially rectangular characteristics and having a duration dependent upon the varied phase relationship of the signals, control means responsive to the pulses for producing a control voltage having characteristics dependent upon the duration of the pulses, and means responsive to the control voltage for adjusting the speed of the motor to the particular value in accordance with the characteristics of the control voltage.

12. The combination set forth in claim 11 in which the control means is constructed to produce a control voltage having direct characteristics and having a magnitude dependent upon the duration of the pulses.

13. In combination for regulating the speed of a motor in driving a medium capable of recording and reproducing information, means coupled to the motor for generating first and second signals having relative amplitudes and phases dependent upon the speed of the motor above, at or below a particular value, means responsive to the phase relationship between the first and second signals for adjusting the speed of the motor to the particular value, and means responsive to the relative amplitudes of the first and second signals for maintaining a particular constraint on the medium during the acceleration of the motor to the particular speed and for preventing such constraint on the medium upon an acceleration of the motor to the particular speed.

14. In combination for regulating the speed of a motor in driving a medium capable of recording and reproducing information between first and second reels, means coupled to the motor for generating first and second signals having relative amplitudes and phases dependent upon the speed of the motor above, at or below a particular value, means responsive to the phase relationship between the first and second signals for adjusting the speed of the motor to the particular value, and means responsive to the amplitude relationship between the first and second signals for preventing the motor from operating during a deceleration of the medium to standstill.

15. The combination set forth in claim 14, including, means responsive to the amplitude relationship between the first and second signals for maintaining tension on the medium during the acceleration of the medium to the particular speed and for relieving such tension on the medium during the operation of the motor at substantially the particular speed.

16. In combination for regulating the speed of a motor in driving a medium capable of recording and reproducing information, means coupled to the motor for generating first and second signals having relative amplitudes and phases dependent upon the speed of the motor above, at or below a particular value, means responsive to the phase relationship between the first and second signals for producing pulses having a duration dependent upon such phase relationship, means responsive to the pulses for producing a first direct voltage having a magnitude dependent upon the duration of the pulses, means responsive to the first direct voltage for adjusting the speed of the motor in accordance with the magnitude of such voltage, means responsive to the relative amplitudes of the first and second signals for producing a second direct voltage having a magnitude dependent upon such relative amplitudes, and means responsive to the second direct voltage for regulating the tension on the medium in accordance with the magnitude of the voltage.

17. The combination set forth in claim 16, including, means responsive to the second direct voltage for inhibiting the energizing of the motor during the deceleration of the medium to standstill.

References Cited in the file of this patent

UNITED STATES PATENTS

| | | |
|---|---|---|
| 2,575,925 | Morris | Nov. 20, 1951 |
| 2,803,793 | Wible | Aug. 20, 1957 |
| 2,863,100 | Rice | Dec. 2, 1958 |
| 2,864,988 | Kline et al. | Dec. 16, 1958 |
| 2,910,638 | Linn | Oct. 27, 1959 |
| 2,913,652 | Greenberg et al. | Nov. 17, 1959 |

FOREIGN PATENTS

| | | |
|---|---|---|
| 767,173 | Great Britain | Jan. 30, 1957 |